(12) United States Patent
Matsuzawa

(10) Patent No.: US 11,135,655 B2
(45) Date of Patent: Oct. 5, 2021

(54) CBN SINTERED COMPACT AND CUTTING TOOL

(71) Applicant: KYOCERA Corporation, Kyoto (JP)

(72) Inventor: Masahito Matsuzawa, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 860 days.

(21) Appl. No.: 15/529,365

(22) PCT Filed: Nov. 20, 2015

(86) PCT No.: PCT/JP2015/082695
§ 371 (c)(1),
(2) Date: May 24, 2017

(87) PCT Pub. No.: WO2016/084738
PCT Pub. Date: Jun. 2, 2016

(65) Prior Publication Data
US 2018/0141131 A1    May 24, 2018

(30) Foreign Application Priority Data

Nov. 25, 2014 (JP) .............................. JP2014-237806
Jan. 26, 2015 (JP) ................................. 2015-012440

(51) Int. Cl.
*B23B 27/18* (2006.01)
*C22C 19/07* (2006.01)
(Continued)

(52) U.S. Cl.
CPC ............ *B23B 27/18* (2013.01); *B23B 27/148* (2013.01); *C04B 35/5831* (2013.01);
(Continued)

(58) Field of Classification Search
CPC ... B23B 27/18; B23B 27/148; C04B 35/5831; C22C 19/07; C22C 26/00
See application file for complete search history.

(56) References Cited

U.S. PATENT DOCUMENTS 10,124,413 B2 * 11/2018 Hirosaki ............. C04B 35/6303
2008/0286558 A1   11/2008 Kukino et al.
(Continued)

FOREIGN PATENT DOCUMENTS

CN    101102978 A    1/2008
CN    101341268 A    1/2009
(Continued)

OTHER PUBLICATIONS

International Search Report (Form PCT/ISA/210) issued for PCT/JP2015/082695, dated Feb. 16, 2016.
(Continued)

*Primary Examiner* — Nicholas A Wang
*Assistant Examiner* — Jiangtian Xu
(74) *Attorney, Agent, or Firm* — Viering, Jentschura & Partner mbB

(57) ABSTRACT

Object: To provide a cBN sintered compact having high wear resistance, and a cutting tool having high wear resistance that uses the cBN sintered compact.
Solution: A cBN sintered compact (1) including 50 vol. % or greater of cBN particles (2); and a binder phase (4) including Co; wherein in the binder phase (4), intra-phase particles (8) including $Co_aW_b$ (where $0 \leq a \leq 0.95$ and $0.05 \leq b \leq 1$) are present. Additionally, a cutting insert (20) or similar cutting tool either includes a cBN tip (25) made from the cBN sintered compact (1) or is entirely made from the cBN sintered compact (1). The cBN sintered compact (1) and the cutting insert (20) or similar cutting tool have increased wear resistance.

19 Claims, 1 Drawing Sheet

(51) Int. Cl.
    *C04B 35/645*     (2006.01)
    *C04B 35/63*     (2006.01)
    *B23B 27/14*     (2006.01)
    *C04B 35/5831*     (2006.01)
    *C22C 26/00*     (2006.01)
    *C22C 29/16*     (2006.01)
    *B22F 5/00*     (2006.01)

(52) U.S. Cl.
    CPC ........ *C04B 35/6303* (2013.01); *C04B 35/645* (2013.01); *C22C 19/07* (2013.01); *C22C 26/00* (2013.01); *B22F 2005/001* (2013.01); *B22F 2998/10* (2013.01); *B22F 2999/00* (2013.01); *B23B 2222/84* (2013.01); *B23B 2226/125* (2013.01); *B23B 2240/08* (2013.01); *C04B 2235/386* (2013.01); *C04B 2235/3847* (2013.01); *C04B 2235/40* (2013.01); *C04B 2235/402* (2013.01); *C04B 2235/405* (2013.01); *C04B 2235/5436* (2013.01); *C04B 2235/5445* (2013.01); *C04B 2235/6567* (2013.01); *C04B 2235/661* (2013.01); *C04B 2235/80* (2013.01); *C04B 2235/96* (2013.01); *C22C 29/16* (2013.01)

(56) References Cited

U.S. PATENT DOCUMENTS

2009/0293370 A1    12/2009    Goudemond et al.
2013/0000213 A1    1/2013    Okamura et al.
2013/0213197 A1    8/2013    Persson
2013/0309468 A1*    11/2013    Kudo .................... C22C 26/00
                                                                                   428/216

FOREIGN PATENT DOCUMENTS

CN        103097058 A    5/2013
JP        04-099805 A    3/1992
JP        2013-538937 A    10/2013
JP        5614460 B2    9/2014

OTHER PUBLICATIONS

Written Opinion (Form PCT/ISA/237) issued for PCT/JP2015/082695, dated Feb. 16, 2016.
Yongjun Li et al., "Study of high pressure sintering behavior of CBN composites starting with CBN—Al mixtures", China Academic Journal Electronic Publishing House, 2008, 6 pages, China.

* cited by examiner

CBN SINTERED COMPACT AND CUTTING TOOL

TECHNICAL FIELD

The present invention relates to a cBN sintered compact and a cutting tool.

BACKGROUND ART cBN sintered compacts (short for "cubic boron nitride sintered compacts") have excellent wear resistance and, as such, are used as, for example, cutting tools. In particular, cBN sintered compacts are widely used in the machining of cast iron and difficult-to-machine materials such as sintered alloys. For example, Patent Document 1 describes a cBN sintered compact that includes 80 wt. % or greater of cBN; and a binder phase including Al at a content ratio greater than 50 wt. %, an iron group element, and a refractory element such as W. Patent Document 1 describes that, when W is included, it is present as a boride. Additionally, Patent Document 2 describes a cBN sintered compact that includes from 40 to 85 vol % of cBN, and W, Co, or the like as a binder phase. Moreover, the Examples of Patent Document 2 describe a cBN sintered compact that includes $Co_3W_3C$, CoWB, and WC as mixed crystals as the binder phase.

CITATION LIST

Patent Literature

Patent Document 1: Japanese Unexamined Patent Application Publication (Translation of PCT Application) No. 2013-538937A Patent Document 2: Japanese Patent No. 5614460B

SUMMARY OF INVENTION

Solution to Problem

A cBN sintered compact of the present embodiment includes 50 vol. % or greater of cBN particles, and a binder phase including Co. In the binder phase, intra-phase particles including $Co_aW_b$, where $0 \leq a \leq 0.95$ and $0.05 \leq b \leq 1$, are present.

Additionally, a cutting tool of the present embodiment includes the cBN sintered compact as a cutting edge portion.

DESCRIPTION OF EMBODIMENTS

Figure 1:
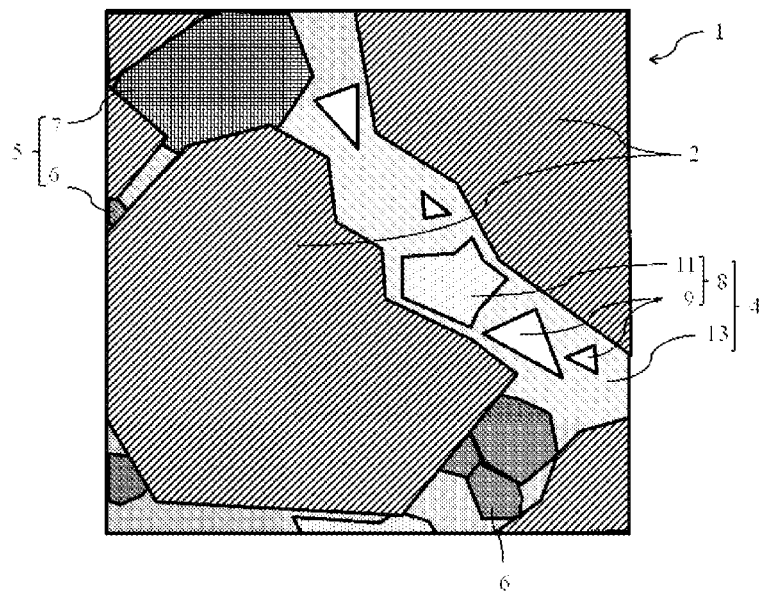
FIG. 1 is a schematic drawing illustrating an example of the structure of a cBN sintered compact of the present embodiment.

A cBN sintered compact 1 contains 50 vol. % or greater of cBN particles 2, a binder phase 4 containing Co (hereinafter, referred to as "Co binder phase"), and compound particles 5. In the present embodiment, the holding power of the cBN particles 2 is high and, as such, the wear resistance of the cBN sintered compact 1 is high. The Co binder phase 4 and the compound particles 5 have an effect of decreasing shedding of the cBN particles 2. Note that, volume ratios of the cBN particles 2, the Co binder phase 4, and the compound particles 5 in the present embodiment are measured as area ratios of the cBN particles 2, the Co binder phase 4, and the compound particles 5 in a cross-section photograph of the cBN sintered compact 1. These two-dimensional area ratios are deemed to be equal to three-dimensional volume ratios, and are considered to be the volume ratios of the phases. A preferable content ratio of the cBN particles 2 may be from 80 to 97 vol. %, and a more preferable content ratio may be from 90 to 96 vol. %. A preferable range of the Co binder phase 4 may be from 3 to 14 vol. %, and a preferable range of the compound particles 5 may be from 0.5 to 20 vol. %.

In the present embodiment, from the perspective of increasing the wear resistance and strength of the cBN sintered compact 1, an average particle size of the cBN particles 2 may be in a range of from 0.5 to 5 μm and more preferably in a range of from 1 to 3 μm. When the average particle size is within this range, the hardness of the cBN sintered compact 1 will be high and shedding of the cBN particles 2 can be decreased. Note that, in the present embodiment, measurement of the particle size of the cBN particles 2 is carried out in accordance with the measurement method of the average particle size of cemented carbide defined in CIS-019D-2005. Additionally, in the present embodiment, a maximum particle size of the Co binder phase 4, as observed in a 30 μm square field of view of a cross-section of the cBN sintered compact 1, is from 0.1 to 0.5 μm. When the maximum particle size is within this range, the cBN sintered compact 1 will be free of regions where the Co binder phase 4 has aggregated. As a result, aggregated portions is less apt to become fracture sources and lead to declines in the strength of the cBN sintered compact 1, and the strength of the cBN sintered compact 1 is high. In the present embodiment, the maximum particle size of the Co binder phase 4 is a maximum value of the length in a direction perpendicular to the longitudinal direction of the Co binder phase 4, as observed in a 30 μm square cross-section of the cBN sintered compact 1 using a scanning electron microscope (SEM) or a transmission electron microscope (TEM).

In the present embodiment, intra-phase particles 8 including $Co_aW_b$ (where $0 \leq a \leq 0.95$ and $0.05 \leq b \leq 1$) are present in the Co binder phase 4. The Co binder phase 4 can exist in complex shapes so as to be in close contact along the outer periphery of the cBN particles 2. As a result, the Co binder phase 4 can adhere strongly to the outer periphery of the cBN particles 2. Therefore, the bonding strength between the cBN particles 2 can be increased. Moreover, the intra-phase particles 8 have high thermal conductivity and do not easily deform, even at high temperatures. As such, improved thermal resistance and plastic deformation resistance of the Co binder phase 4 is obtained. As such, the cBN sintered compact 1 also has high wear resistance at high temperatures. As a result, a cutting tool provided with a cBN tip made from the cBN sintered compact 1 of the present embodiment, or a cutting tool formed entirely from the cBN sintered compact 1 will have high wear resistance even when performing high-speed cutting in which the cutting portion reaches high temperatures or when cutting difficult-to-machine materials. Thus, extended tool life can be achieved.

Note that the values a and b of the intra-phase particles 8 can be identified by an EDS analysis in a restricted visual field of a TEM observation and by a lattice constant which is measurable in an electron diffraction image.

The intra-phase particles 8 are present in the Co binder phase 4 at a ratio of from 30 to 90 vol. %. Due to this configuration, the wear resistance of the cBN sintered compact 1 at ambient temperatures and at high temperatures can be increased. Other than the intra-phase particles 8, metal Co 13 is also present as a matrix in the Co binder phase 4. The metal Co 13 may contain W at a mass ratio that is at least 10% less than the mass ratio of the W content in the intra-phase particles 8.

In cases where an alloy (hereinafter referred to as "alloy particles") 9 made from $Co_aW_b$ (where $0.80 \leq a \leq 0.95$ and $0.05 \leq b \leq 0.20$) is included as the intra-phase particles 8, heat radiating properties can be improved and plastic deformability can be decreased at high temperatures of the Co binder phase 4 and, as such, thermal resistance of the Co binder phase 4 can be further increased.

In cases where a carbide (hereinafter referred to as "carbide particles") 11 made from $Co_aW_bC$ (where $0 \leq a \leq 0.8$ and $0.2 \leq b \leq 1$) is included as the intra-phase particles 8, plastic deformability of the Co binder phase 4 at high temperatures can be decreased and, as such, thermal resistance of the Co binder phase 4 can be further increased. Examples of the carbide particles 11 include WC, $W_3Co_3C$, $W_4Co_2C$, $W_2Co_2C$, $W_6Co_6C$, $W_6Co_3C_2$, $Co_3W_{10}C_4$, and $W_2Co_4C$. As a result of this configuration, the hardness and thermal conductivity of the Co binder phase 4 can be increased. As a result, the cBN sintered compact 1 has high wear resistance at high temperatures.

In cases where the intra-phase particles 8 consist of the alloy particles 9 and the alloy particles 9 are present in the Co binder phase 4 at a ratio of from 30 to 90 vol. %, the thermal resistance and plastic deformation resistance of the cBN sintered compact 1 increase. Additionally, in cases where the intra-phase particles 8 consist of the carbide particles 11 and the carbide particles 11 are present in the Co binder phase 4 at a ratio of from 10 to 60 vol. %, the thermal resistance and plastic deformation resistance of the cBN sintered compact 1 increase.

Note that the ratio of the intra-phase particles 8 in the Co binder phase 4 is defined as a volume ratio of the intra-phase particles 8, which is obtained by calculating the area proportion of the intra-phase particles 8 occupied in the Co binder phase 4 in TEM observation. Here, the two-dimensional area ratio is deemed to be equal to a three-dimensional volume ratio.

The intra-phase particles 8 may be present as a mixture of the alloy particles 9 and the carbide particles 11. In this case, the intra-phase particles 8 may be preferably present in the Co binder phase 4 at a ratio of from 72 to 85 vol. %. Here, in cases where a ratio (S2/S1) of a volume ratio S2 of the carbide particles 11 to a volume ratio S1 of the alloy particles 9 is from 0.1 to 1.2, deformation of the Co binder phase 4 can be decreased and the plastic deformation resistance of the cBN sintered compact 1 can be increased.

Additionally, whether the intra-phase particles 8 are the alloy particles 9 or the carbide particles 11 can be identified by an electron diffraction image in a restricted visual field of a TEM observation.

An average particle size of the intra-phase particles 8 is from 30 to 300 nm. As a result of this configuration, the effects of the Co binder phase 4 for decreasing shedding of the cBN particles 2 is great, and the wear resistance of the cBN sintered compact 1 can be increased. For the average particle size of the intra-phase particles 8, the area of an intra-phase particle 8 observed under a microscope is calculated, this area is converted into a circle, and the diameter of this circle is found. This diameter is defined as the particle size. Then, the particles sizes of at least five or more neighboring intra-phase particles 8 are found. The average value of these particle sizes is defined as the average particle size.

The compound particles 5 include Al-containing Al compound particles 6. Examples of the Al compound particles 6 include AlN, $AlB_2$, $AlB_{12}$, $Al_2O_3$, and $Al_3B_6Co_{20}$. The Al compound particles are advantageous from the perspective of increasing the heat radiating properties of the cBN sintered compact 1. An average particle size of the Al compound particles 6 is from 50 to 250 nm. As a result of this configuration, shedding of the cBN particles 2 can be decreased, and the thermal resistance of the cBN sintered compact 1 can be increased. The sinterability of the cBN sintered compact 1 increases due to the presence of the Al compound particles 6. A portion of the Al compound particles 6 may be present in the Co binder phase 4.

Here, in cases where $Al_3B_6Co_{20}$ is included as the Al compound particles 6, adhesiveness of the Co binder phase 4 increases and, as such, shedding of the cBN particles 2 can be decreased, which results in increased wear resistance of the cBN sintered compact 1. Additionally, wire electric discharge machining of the cBN sintered compact 1 is facilitated.

$Al_3B_6Co_{20}$ has a complex composition and, as such, is easier to confirm in an X-ray diffraction measurement of the cBN sintered compact 1. Here, with $Al_3B_6Co_{20}$, peaks exist where $2\theta=38.5°, 42.2°, 45.0°, 49.2°, 51.3°$, and the like, but the peak where $2\theta=38.5°$ overlaps with the peak of the metal Al, and the peaks where $2\theta=49.2°$ and $51.3°$ overlap with the peaks of BCo. As such, whether or not $Al_3B_6Co_{20}$ exists is determined by the presence or absence of either of the peaks where $2\theta=42.2°$ or $45.0°$, which do not overlap with the peaks of other crystal phases. Note that, for each peak, the value of the diffraction angle ($2\theta$) may deviate due to slight differences in the solid solution state, residual stress, and the like. However, as long as the crystal lattice of the $Al_3B_6Co_{20}$ is maintained and the peak at each diffraction angle is detected, it can be determined that the $Al_3B_6Co_{20}$ peak exists.

It may be preferable that the maximum peak intensity of the $Al_3B_6Co_{20}$ with respect to the peak intensity of cBN (111) is from 0.02 to 0.25. Here, the maximum peak intensity of the $Al_3B_6Co_{20}$ is defined as the higher peak intensity among the peaks where $2\theta=42.2°$ and $45.0°$. When the maximum peak intensity is within this range, shedding of the cBN particles 2 can be decreased. A more preferable range of the maximum peak intensity of the $Al_3B_6Co_{20}$ with respect to the peak intensity of cBN (111) may be from 0.1 to 0.25.

The compound particles 5 include W-containing W compound particles 7. Examples of the W compound particles 7 include WC, WB, $W_2B$, $Co_2WB$, $W_2Co_{21}B_6$, and $Co_3W_3C$. The W compound particles 7 have effects for decreasing shedding of the cBN particles 2. An average particle size of the W compound particles 7 is from 100 to 1000 nm. Due to this configuration, the toughness of the cBN sintered compact 1 can be increased.

Here, WC can be selected as either of the carbide particles 11 and the W compound particles 7. As illustrated in FIG. 1, when WC is present as the carbide particles 11, it is scattered within the Co binder phase 4, and when present as the W compound particles 7, it exists separately from the Co binder phase 4.

Figure 2:
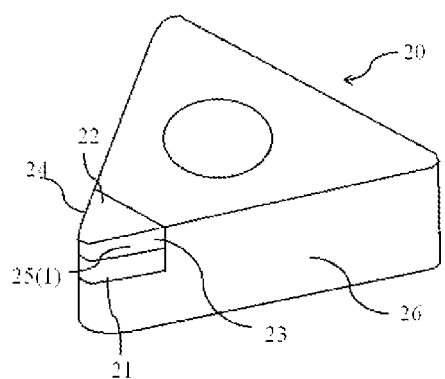
FIG. 2 is a schematic perspective view illustrating an example of a cutting tool provided with a cBN tip made from the cBN sintered compact of the present embodiment.

Next, an example of a cutting tool provided with a cBN tip 25 made from the cBN sintered compact described above is described using FIG. 2. With a cutting insert (hereinafter abbreviated as simply "insert") 20 in FIG. 2, a cBN tip 25 made from the cBN sintered compact 1 is brazed to a tip of a tool main body 26 via a back body 21 made from a cemented carbide containing WC and Co. The cBN tip 25 includes a rake face 22 on a top surface in the illustrated drawing, a relief face 23 on the side surface in the illustrated drawing, and a cutting edge 24 on at least a portion of intersecting ridge line of the rake face 22 and the relief face 23. The tool main body 26 is made from a cemented carbide or a metal such as high-speed steel, alloy steel, or the like. Note that the back body 21 can be omitted. Additionally, with the insert 20 of FIG. 2, only the tip 25 is made from the cBN sintered compact 1, but the embodiments are not limited thereto and the entire insert 20 may be made from the cBN sintered compact 1. In either case, the cBN sintered compact 1 constitutes the cutting edge portion of the insert 20.

Next, a manufacturing method for the cBN sintered compact described above is described.

For example, from 75 to 88 mass % of cBN raw material powder having an average particle size of from 1.0 to 4.5 μm, from 10 to 24.9 mass % of metal Co raw material powder having an average particle size of from 1.0 to 2.5 μm, from 0.1 to 5 mass % of metal Al raw material powder having an average particle size of from 0.5 to 1.8 μm, and from 0 to 20 mass % of WC raw material powder having an average particle size of from 0.3 to 1.5 μm are mixed at these proportions.

The formulation powers described above are ground and mixed in a ball mill for from 15 to 72 hours. Then, as necessary, the resulting mixture is molded into a predetermined shape. A known molding technique can be used for the molding. Examples thereof include press molding, injection molding, cast molding, extrusion molding, and the like.

Then, the resulting product is charged into an ultra high pressure heating apparatus along with the back support body made from the cemented carbide, and is subjected to ultra high pressure heat treatment. According to the present embodiment, pressurization is performed in two steps, namely, a first pressurization step in which the product is held at a predetermined temperature in a range of from 1100 to 1300° C. and under pressure of from 5 to 7 GPa for from 1 to 10 minutes; and a second pressurization step in which the product is held at a predetermined temperature in a range of from 1450 to 1600° C. and under pressure of from 4 to 6 GPa for from 10 to 60 minutes. The pressure in the second pressurization step is lower than the pressure in the first pressurization step. As a result, a cBN sintered compact can be obtained that includes 50 vol. % or greater of cBN particles, and a Co binder phase; wherein intra-phase particles including $Co_aW_b$ (where $0 \leq a \leq 0.95$ and $0.05 \leq b \leq 1$) are present in the Co binder phase.

Here, without the first pressurization step, the Co binder phase will disappear, and the Co will be present as a compound. If the holding time in the first pressurization step is longer than 10 minutes, the W in the Co binder phase will diffuse uniformly and, as a result, the intra-phase particles cannot be made to exist in the Co binder phase. Additionally, if the average particle sizes and the formulation ratios of the raw material powders are within the ranges described above, the cBN sintered compact described above can be stably manufactured.

A portion having predetermined dimensions is cut from the fabricated cBN sintered compact by wire electric discharge machining, and this cut out portion is brazed to a notch step portion formed in a tip portion of a tool main body made from cemented carbide. Then, the top surface and the side surface are ground. Furthermore, as desired, at least a portion of the intersecting ridge line of the top surface constituting the rake face and the side surface constituting the relief face, that is, the blade edge of the cutting edge, may be subjected to a honing process. Thus, the cutting tool of the present embodiment can be fabricated.

EXAMPLES

The compositions shown in Table 1 were prepared using cBN power, metal Co powder, metal Al powder, and WC powder having the average particle sizes shown in Table 1. These powders were mixed for 15 hours in a ball mill using alumina balls. Next, each of the mixed powders was pressure molded under a pressure of 98 MPa. A backing support was stacked on each resulting powder compact and then the powder compacts were set in an ultra high pressure heating apparatus and subjected to ultra high pressure heat treatment at the conditions shown in Table 1. Thus, cBN sintered compacts were obtained.

Next, a predetermined shape was cut by wire electric discharge machining from the integrated article constituted by the fabricated cBN sintered compact and the back support body. Then, the cut-out portion was brazened to the notch step portion formed in the tip portion of the tool main body made from cemented carbide, such that the back support body contacts the notch step portion; and the top surface and the side surface were ground. Then, cutting edge treatments (chamfer honing and R honing) were performed on at least a portion of the intersecting ridge line of the top surface and the side surface, that is, on the blade edge of the cutting edge, using a diamond wheel. Thus, an insert provided with a tip made from a cBN sintered compact, and having a JIS CNGA 120408 shape was fabricated.

For the obtained insert, the structure of an arbitrary cross-section of the tip made from the cBN sintered compact was observed under a SEM or a TEM to confirm the presence or absence of the cBN particles, the Co binder phase, the intra-phase particles (the alloy particles and the carbide particles), and the compound particles (the Al compound particles and the W compound particles). Additionally, the content ratio of each of these constituents was calculated. The a and b values in $Co_aW_b$ were identified by an electron diffraction image in a restricted visual field of a TEM observation. Additionally, the average particle size of each particle was measured in accordance with the measurement method of the average particle size of cemented carbide defined in CIS-019D-2005. The results are shown in Tables 2 and 3.

Furthermore, X-ray diffraction measurement was performed on the top surface constituting the rake face and the side surface constituting the relief face of the cBN tip using a D8 DISCOVER with GADDS Super Speed (manufactured by Bruker AXS; x-ray source: $CuK_\alpha$, collimator diameter: 0.8 mmΦ). In this measurement, the crystal phases in the cBN sintered compact were identified, and ratio of the maximum peak intensity among the peaks attributed to each crystal phase to the peak intensity of cBN (111), when the peak intensity of cBN (111) is set to 1, is shown in Table 3.

Next, using the obtained inserts, cutting testing was performed under the following cutting conditions. Results are shown in Table 3.

Cutting method: Outer diameter turning processing
Workpiece: FC250 sleeve material
Cutting speed: 700 m/min
Feed rate: 0.2 mm/rev
Depth of Cut: 0.2 mm
Cutting conditions: Wet (with cutting oil)
Evaluation method: Cutting length until wear or damage was evaluated.

TABLE 1

| | Compounding composition (average particle size: μm; added amount: mass %) | | | | | | | | Ultra high pressure pressurization | | | | | |
|---|---|---|---|---|---|---|---|---|---|---|---|---|---|---|
| | cBN | | Metal Co | | Metal Al | | WC | | Step 1 | | | Step 2 | | |
| Sample No. | Average particle size | Added amount | Average particle size | Added amount | Average particle size | Added amount | Average particle size | Added amount | Temperature (°C.) | Pressure (GPa) | Time (Minute) | Temperature (°C.) | Pressure (GPa) | Time (Minute) |
| 1 | 3.3 | 86.2 | 1.3 | 6.8 | 1.5 | 0.3 | 0.5 | 6.7 | 1200 | 4.7 | 4 | 1550 | 5.5 | 18 |
| 2 | 3.2 | 86.0 | 1.3 | 6.8 | 1.5 | 0.3 | 0.5 | 6.9 | 1150 | 4.5 | 4 | 1550 | 5.5 | 20 |
| 3 | 3.4 | 79.1 | 1.3 | 5.3 | 1.5 | 1.7 | 0.5 | 13.9 | 1100 | 4.8 | 7 | 1450 | 5.6 | 15 |
| 4 | 3.2 | 79.2 | 1.3 | 5.3 | 1.5 | 1.8 | 0.5 | 13.7 | 1150 | 5.0 | 7 | 1500 | 5.5 | 15 |
| 5 | 3.8 | 65.0 | 1.3 | 9.2 | 1.5 | 0.1 | 0.5 | 25.7 | 1200 | 4.5 | 8 | 1600 | 5.5 | 10 |
| 6 | 3.5 | 75.1 | 1.3 | 5.1 | 1.5 | 0.1 | 0.5 | 19.7 | 1200 | 4.5 | 5 | 1450 | 5.5 | 15 |
| 7 | 3.2 | 74.5 | 1.3 | 22.5 | — | | 0.2 | 3.0 | 1250 | 6.0 | 10 | 1500 | 5.7 | 15 |
| 8 | 3.5 | 85.4 | 1.5 | 11.1 | 4.0 | 0.1 | 0.4 | 3.4 | 1250 | 6.0 | 2 | 1400 | 5.5 | 25 |
| 9 | 3.3 | 73.9 | 1.5 | 17.3 | — | | 0.4 | 8.8 | 1200 | 6.0 | 2 | 1450 | 5.8 | 25 |
| 10 | 1.5 | 83.7 | 1.5 | 10.8 | 4.0 | 0.1 | 0.4 | 5.4 | 1250 | 6.0 | 2 | 1400 | 5.5 | 25 |
| 11 | 4.8 | 62.1 | 1.3 | 10.4 | 1.5 | 0.1 | 0.5 | 27.4 | 1150 | 5.5 | 20 | 1400 | 5.5 | 8 |
| 12 | 3.4 | 61.1 | 1.3 | 11.4 | 1.5 | 0.2 | 0.5 | 27.3 | 1150 | 5.5 | 20 | 1400 | 5.5 | 10 |
| 13 | 3.1 | 82.9 | 1.2 | 9.5 | 4.0 | 4.1 | 0.4 | 3.5 | | — | | 1500 | 5.8 | 20 |
| 14 | 3.5 | 86.8 | 1.2 | 5.5 | 4.0 | 4.2 | 0.4 | 3.5 | | — | | 1500 | 5.5 | 20 |
| 15 | 3.3 | 55.9 | 1.3 | 18.7 | 1.5 | 6.4 | 0.5 | 19.0 | 1150 | 5.8 | 3 | 1550 | 5.0 | 25 |

TABLE 2

| | cBN particles | | Co binder phase | | Intra-phase particles (content ratio unit: vol. %; average particle size unit: nm) | | | | | | | | |
|---|---|---|---|---|---|---|---|---|---|---|---|---|---|
| | | Average | | Maximum | Alloy particles | | | Carbide particles | | | | Average | Total |
| Sample No. | Content ratio (vol. %) | particle size (μm) | Content ratio (vol. %) | particle size (μm) | a | b | Content ratio | a | b | Content ratio | S2/S1* | particle size | content ratio |
| 1 | 85.0 | 2.1 | 4.0 | 0.35 | 0.86 | 0.14 | 47 | 0.52 | 0.48 | 25 | 0.5 | 79 | 72.0 |
| 2 | 84.8 | 2.3 | 4.2 | 0.33 | 0.87 | 0.13 | 70 | 0.51 | 0.49 | 10 | 0.1 | 131 | 80.0 |
| 3 | 78.0 | 2.3 | 3.5 | 0.28 | 0.89 | 0.09 | 55 | 0.55 | 0.45 | 30 | 0.5 | 84 | 85.0 |
| 4 | 78.2 | 2.2 | 3.6 | 0.28 | 0.90 | 0.10 | 60 | 0.60 | 0.40 | 30 | 0.5 | 94 | 90.0 |
| 5 | 63.3 | 2.5 | 8.2 | 0.42 | 0.87 | 0.13 | 80 | 0.40 | 0.60 | 10 | 0.1 | 55 | 90.0 |
| 6 | 73.2 | 2.5 | 4.5 | 0.31 | 0.85 | 0.15 | 20 | 0.39 | 0.61 | 45 | 2.3 | 65 | 65.0 |
| 7 | 72.3 | 2.3 | 12.5 | 0.83 | 0.87 | 0.13 | 16 | 0.80 | 0.20 | 20 | 1.3 | 34 | 36.0 |
| 8 | 80.0 | 2.2 | 8.1 | 0.61 | 0.95 | 0.05 | 18 | | | — | | 135 | 18.0 |
| 9 | 62.9 | 2.3 | 15.5 | 0.64 | 0.78 | 0.20 | 88 | 0.82 | 0.18 | 5 | 0.06 | 250 | 93.0 |
| 10 | 80.5 | 1.4 | 8.7 | 0.57 | | — | | 0.82 | 0.18 | 25 | — | 350 | 25.0 |
| 11 | 60.2 | 3.5 | 9.1 | 0.59 | 0.72 | 0.28 | 91 | | | — | | 20 | 91.0 |
| 12 | 57.3 | 2.6 | 9.3 | 0.50 | 0.97 | 0.30 | 100 | | | — | | 100 | 100.0 |
| 13 | 79.2 | 2.1 | 7.9 | 1.01 | | | | | | — | | | |
| 14 | 84.7 | 2.3 | 4.6 | 0.65 | | | | | | — | | | |
| 15 | 48.0 | 2.2 | 16.1 | 1.23 | 0.85 | 0.15 | 25 | 0.51 | 0.49 | 20 | 0.8 | 48 | 45.0 |

*S2/S1: Ratio of existence ratio S1 of carbide particles to existence ratio S2 of alloy particles

TABLE 3

| | Compound particles (average particle size unit: nm) | | | | XRD maximum peak intensity ratio | | | | |
|---|---|---|---|---|---|---|---|---|---|
| | Al compound particles | | W compound particles | | (ratio with respect to cBN (111)) | | | | Cutting |
| Sample No. | Type | Average particle size | Type | Average particle size | $Al_3B_6Co_{20}$ | Co (200) | AlN | BCo | length (km) |
| 1 | AlN, $Al_3B_6Co_{20}$ | 80 | WC, $Co_3W_3C$ | 180 | 0.04 | 1.5 | 0.10 | — | 16.2 |
| 2 | AlN, $Al_3B_6Co_{20}$ | 100 | WC, $Co_3W_3C$ | 200 | 0.05 | 1.6 | 0.11 | — | 15.1 |
| 3 | $Al_3B_6Co_{20}$ | 80 | WC | 130 | 0.20 | 1.2 | — | — | 13.2 |
| 4 | $Al_3B_6Co_{20}$ | 70 | WC, $Co_3W_3C$ | 150 | 0.19 | 1.1 | — | — | 12.8 |
| 5 | $Al_3B_6Co_{20}$ | 50 | WC, $Co_3W_3C$ | 650 | 0.26 | 1.0 | — | — | 11.3 |
| 6 | AlN | 50 | WC | 850 | — | 1.1 | 0.21 | — | 10.9 |

TABLE 3-continued

| | Compound particles (average particle size unit: nm) | | | XRD maximum peak intensity ratio (ratio with respect to cBN (111)) | | | | |
|---|---|---|---|---|---|---|---|---|
| | Al compound particles | | W compound particles | | | | | |
| Sample No. | Type | Average particle size | Type | Average particle size | $Al_3B_6Co_{20}$ | Co (200) | AlN | BCo | Cutting length (km) |
| 7 | — | | WC, $Co_3W_3C$ | 400 | — | 0.6 | — | — | 9.4 |
| 8 | — | | WC | 50 | — | 0.5 | — | — | 8.7 |
| 9 | — | | WC, $Co_3W_3C$ | 50 | — | 0.4 | — | — | 7.5 |
| 10 | — | | WC, $Co_3W_3C$ | 1050 | — | 1.0 | — | — | 7.4 |
| 11 | — | | WC, $Co_3W_3C$ | 70 | — | 1.2 | — | — | 6.1 |
| 12 | $Al_3B_6Co_{20}$ | 80 | WC, $Co_3W_3C$ | 200 | 0.05 | 1.2 | 0.19 | — | 5.5 |
| 13 | AlN, $Al_3B_6Co_{20}$ | 180 | WC, $Co_3W_3C$, $W_2Co_{21}B_6$ | 160 | 0.05 | 1.0 | 0.11 | — | 5.6 |
| 14 | AlN, $Al_2O_3$ | 100 | WC, $Co_3W_3C$, $W_2Co_{21}B_6$ | 300 | 0.06 | 1.1 | 0.12 | — | 5.3 |
| 15 | AlN, $Al_3B_6Co_{20}$ | 50 | WC, $Co_3W_3C$, $W_2Co_{21}B_6$ | 450 | — | 1.0 | 0.22 | 0.12 | 3.7 |

According to the results shown in Tables 1 to 3, wear resistance declined and the cutting length was short in Sample No. 15 in which the content of the cBN particles was less than 50 vol. %, Sample Nos. 13 and 14 in which the intra-phase particles were not included, and Sample No. 12 in which the value a of the intra-phase particles was greater than 0.95.

In contrast, cutting length was long in each of Sample Nos. 1 to 11, which contained 50 vol. % or greater of the cBN particles and also contained a Co binder phase in which the $Co_aW_b$ alloy existed. Particularly, cutting length was long in Sample Nos. 1 to 9 in which the average particle size of the intra-phase particles was from 30 to 300 nm; and cutting length was even longer in Samples Nos. 1 to 7 in which the intra-phase particles were present in the binder phase at a ratio of from 30 to 90 vol. %.

Additionally, cutting length was long in Sample Nos. 1 to 8 in which 0.80≤a≤0.95 and 0.05≤b≤0.2 were satisfied for the $Co_aW_b$ alloy in the intra-phase particles; and cutting length was even longer in Sample Nos. 1 to 6 in which the $Co_aW_b$ alloy was present in the Co binder phase at a ratio of from 20 to 90 vol. %. Furthermore, cutting length was long in Sample Nos. 1 to 7 in which 0≤a≤0.8 and 0.2≤b≤1 were satisfied for the $Co_aW_bC$ in the intra-phase particles. Moreover, cutting length was long in Sample Nos. 1 to 6 in which the ratio (S2/S1) of the existence ratio S2 of the carbide particles to the existence ratio S1 of the alloy particles was from 0.1 to 1.2.

Additionally, cutting length was long in Sample Nos. 1 to 9 in which the average particle size of the cBN particles was from 1.5 to 2.5 μm. Particularly, cutting length was even longer in Sample Nos. 1 to 6 in which the maximum particle size of the binder phase, as observed in a 30 μm square field of view of a cross-section, was from 0.1 to 0.5 μm.

Furthermore, cutting length was even longer in Sample Nos. 1 to 7 in which W compound particles with an average particle size of from 100 to 1000 nm were present; cutting length was even longer in Sample Nos. 1 to 6 in which the Al compound particles were present; particularly, cutting length was even longer for Sample Nos. 1 to 5 that contained $Al_3B_6Co_{20}$; and among these, cutting length was even longer in Sample Nos. 1 to 4 in which the ratio of the maximum peak intensity of the $Al_3B_6Co_{20}$ with respect to the peak intensity of cBN (111) was from 0.02 to 0.25.

REFERENCE SIGNS LIST 1 cBN sintered compact
2 cBN particle
4 Co binder phase
5 Compound particle
6 Al compound particle
7 W compound particle
8 Intra-phase particle
9 Alloy particle
11 Carbide particle
13 Metal Co

What is claimed is:

1. A cBN sintered compact comprising:
   50 vol. % or greater of cBN particles; and
   a binder phase comprising Co,
   wherein
   the binder phase comprises intra-phase particles having the formula $Co_aW_b$, where 0<a≤0.95 and 0.05≤b<1 where a+b=1.

2. The cBN sintered compact according to claim 1, wherein the intra-phase particles are present in the binder phase at a ratio of from 30 to 90 vol. %.

3. The cBN sintered compact according to claim 1, wherein the intra-phase particles are present in the binder phase at a ratio ranging from 20 to 90 vol. %.

4. The cBN sintered compact according to claim 1, wherein the intra-phase particles further comprise a carbide made from $Co_aW_bC$, where 0<a≤0.8 and 0.2≤b<1.

5. The cBN sintered compact according to claim 4, wherein the carbide is present in the binder phase at a ratio of from 10 to 60 vol. %.

6. The cBN sintered compact according to claim 1, wherein:
   the intra-phase particles further comprise carbide particles made from $Co_aW_bC$, where 0<a≤0.8 and 0.2≤b<1, and
   a ratio (S2/S1) of a volume ratio S2 of the carbide to a volume ratio S1 of the intra-phase particles in the binder phase is from 0.1 to 1.2.

7. The cBN sintered compact according to claim 1, wherein an average particle size of the intra-phase particles is from 30 to 300 nm.

8. The cBN sintered compact according to claim 1, wherein an average particle size of the cBN particles is from 1.5 to 2.5 μm.

9. The cBN sintered compact according to claim 8, wherein a maximum particle size of the binder phase, as observed in a 30 μm square field of view of a cross-section, is from 0.1 to 0.5 μm.

10. The cBN sintered compact according to claim 1, further comprising:
   Al compound particles selected from the group consisting of AlN, $AlB_2$, $AlB_{12}$, $Al_3B_6Co_{20}$, and combinations thereof.

11. The cBN sintered compact according to claim 10, wherein an average particle size of the Al compound particles is from 50 to 250 nm.

12. The cBN sintered compact according to claim 10, wherein the Al compound particles comprise $Al_3B_6Co_{20}$.

13. The cBN sintered compact according to claim 12, wherein in an X-ray diffraction measurement, a ratio of a maximum peak intensity of the $Al_3B_6Co_{20}$ with respect to a peak intensity of cBN (111) is from 0.02 to 0.25.

14. The cBN sintered compact according to claim 1, further comprising:
   W compound particles separate from the intra-phase particles.

15. The cBN sintered compact according to claim 14, wherein an average particle size of the W compound particles is from 100 to 1000 nm.

16. A cutting tool comprising:
   the cBN sintered compact according to claim 1 as a cutting edge portion.

17. The cBN sintered compact according to claim 6, wherein:
   the alloy is present in the binder phase at a ratio of from 20 to 90 vol. %.

18. The cBN sintered compact according to claim 1, wherein the intra-phase particles are alloy particles.

19. A cBN sintered compact comprising:
   50 vol. % or greater of cBN particles; and
   a binder phase consisting of alloy particles having the formula $Co_aW_b$, where $0<a<0.95$ and $0.05<b<1$ where $a+b=1$.

* * * * *